(12) United States Patent
Kang et al.

(10) Patent No.: US 8,023,459 B2
(45) Date of Patent: Sep. 20, 2011

(54) METHOD AND APPARATUS FOR STAGGERED ZONE RESOURCE ALLOCATION IN ORTHOGONAL FREQUENCY DIVISION MULTIPLE ACCESS SYSTEM

(75) Inventors: Chung Gu Kang, Seoul (KR); Jun Ho Son, Gwangmyeong-si (KR)

(73) Assignee: Korea University Industrial & Academic Collaboration Foundation, Seoul (KR)

( * ) Notice: Subject to any disclaimer, the term of this patent is extended or adjusted under 35 U.S.C. 154(b) by 805 days.

(21) Appl. No.: 12/022,459

(22) Filed: Jan. 30, 2008

(65) Prior Publication Data

US 2009/0129401 A1    May 21, 2009

(30) Foreign Application Priority Data

Nov. 16, 2007  (KR) .................. 10-2007-0117500

(51) Int. Cl.
*H04W 4/00* (2009.01)
(52) U.S. Cl. ......... 370/329; 370/330; 370/431; 370/441
(58) Field of Classification Search ........... 370/329, 370/330, 441, 526, 208, 431; 375/260; 455/442, 455/447, 522
See application file for complete search history.

(56) References Cited

U.S. PATENT DOCUMENTS

| | | | |
|---|---|---|---|
| 7,453,912 B2 * | 11/2008 | Laroia et al. | 370/526 |
| 2004/0097238 A1 * | 5/2004 | Hwang et al. | 455/447 |
| 2007/0191015 A1 * | 8/2007 | Hwang et al. | 455/442 |
| 2007/0223606 A1 * | 9/2007 | Yang et al. | 375/260 |
| 2007/0293260 A1 * | 12/2007 | Xiao et al. | 455/522 |

FOREIGN PATENT DOCUMENTS

WO   WO 2007022631 A1 *  3/2007

* cited by examiner

*Primary Examiner* — Brian Nguyen
*Assistant Examiner* — Toan Nguyen
(74) *Attorney, Agent, or Firm* — Rabin & Berdo, P.C.

(57) ABSTRACT

A method for staggered zone resource allocation in an orthogonal frequency division multiple access (OFDMA) system having a cluster includes: dividing a frequency resource of the OFDMA system into a plurality of time zones along a time axis; determining at least two resource allocation start zones among the plurality of time zones in at least two cells of the cluster, respectively; arranging users in each of the at least two cell according to a path loss in a descending order; and sequentially allocating the frequency resource to the arranged users from the at least two resource allocation start zones in the at least two cells, respectively.

8 Claims, 6 Drawing Sheets

US 8,023,459 B2

METHOD AND APPARATUS FOR STAGGERED ZONE RESOURCE ALLOCATION IN ORTHOGONAL FREQUENCY DIVISION MULTIPLE ACCESS SYSTEM

This application claims the benefit of Korean Patent Application No. 2007-0117500, filed on Nov. 16, 2007, which is hereby incorporated by reference in its entirety.

TECHNICAL FIELD

The present application relates to a method and an apparatus for staggered zone resource allocation (SZRA) in an orthogonal frequency division multiple access (OFDMA) system, and more particularly, to a method and an apparatus for SZRA in an OFDMA system where functional deterioration of a user at a cell boundary is minimized and an average transmission rate of a whole cell is improved.

BACKGROUND

In the related art cellular wireless communication system, in order to utilize a limited frequency resource effectively, an identical frequency resource is used in spatially separated two regions. A frequency reuse rate, which is the subject of a cellular wireless communication system, corresponds to a period of cells where an identical frequency is reused. In a multiple cell communication system where a plurality of cells use a frequency band by division, the frequency band is divided into a plurality of sub-frequency bands whose number is the same as a frequency reuse coefficient (K) to reuse a frequency resource with reduction of interference between cells.

FIG. 1 is a view illustrating a frequency resource allocation in a multiple cell system having a frequency reuse coefficient (K) of 3 (K=3) according to the related art. As shown in FIG. 1, the whole frequency band of the system having a frequency reuse coefficient (K) of 3 is divided into three sub-frequency bands and each cell uses one sub-frequency band.

Since an identical frequency band is not used in the adjacent cells, the adjacent cells do not have an interference between each other. In addition, since the cells using an identical frequency band are separated far from each other, an interference between the separated cells is sufficiently reduced. However, since a ratio of a utilization band to a whole frequency band is reduced to 1/K, a utilization efficiency for a frequency band is also reduced. Accordingly, as the frequency reuse coefficient K increases, the interference between cells is reduced. However, an amount of a frequency resource utilized in each cell is reduced and a whole communication capacity of the system is also reduced. In addition, a ratio of a sub-frequency band utilized in each cell to the whole frequency band, i.e., 1/K may be defined as the frequency reuse rate.

For example, in a code division multiple access (CDMA) system, since each cell uses an identical frequency band, the frequency reuse rate is 1. The frequency reuse rate of 1 means that the whole frequency band is utilized in every cell as the identical sub-frequency band.

An orthogonal frequency division multiple access (OFDMA) system has been suggested as a next generation technology for high speed communication. Similarly to the CDMA system, the OFDMA system is being developed to have a frequency reuse rate of 1. In the CDMA system, an interference between users is minimized by allocating orthogonal codes to the users. In the OFDMA system where a frequency resource is utilized by division both in frequency domain and time domain, although the orthogonality between users in each cell is guaranteed, adjacent two cells has a severe interference because the adjacent two cells use an identical frequency band in an identical time zone. Accordingly, a method of minimizing the interference between the adjacent cells simultaneously with improving an efficiency of frequency resource by obtaining a frequency reuse rate close to 1 has been researched and developed in the OFDMA system.

FIG. 2 is a view illustrating a frequency resource allocation in a fractional frequency reuse (FFR) system suggested by IEEE 802.20 Mobile Broadband Wireless Access (MBWA) standard as a solution for interference at a cell boundary. As shown in FIG. 2, a whole frequency band is divided into a plurality of frequency band and a predetermined frequency band is not utilized in each cell. Accordingly, the adjacent cells use different frequency bands to reduce the interference.

In the FFR system, however, allocation of the plurality of frequency bands should be designed based on a cell position. In addition, when an amount of allocable frequency bands into a position using the predetermined frequency is greater or smaller than the number of users, the frequency resource can not be flexibly allocated. Further, unutilization of the predetermined frequency causes waste in the frequency resource and efficiency of the frequency resource is reduced due to the frequency reuse rate lower than 1.

FIG. 3 is a view illustrating a frequency resource allocation in a soft frequency reuse (SFR) system suggested by 3GPPLTE ($3^{rd}$ Generation Partnership Project Long Term Evolution). As shown in FIG. 3, each cell is divided into a center region and a boundary region. The whole frequency band is utilized in the center region of each cell, while a predetermined frequency band is not utilized in the boundary region of each cell similarly to in the FFR system. As a result, the adjacent cells use different frequency bands. In addition, the communication is performed with a lower power in the center region having an excellent channel state and with a higher power in the boundary region of each cell having a different frequency band from the boundary region of the adjacent cell. Accordingly, users at the boundary region use an improved adaptive modulation and coding (AMC) method.

Similarly to the FFR system, however, the SFR system has disadvantages. Although the center region has a frequency reuse rate of 1, the boundary region does not have a frequency reuse rate of 1 and does not use the predetermined frequency band. As a result, efficiency of the frequency resource is reduced. In addition, when users are distributed to be concentrated at a partial region of the cell, efficiency of the frequency resource is reduce because only the frequency band allocated to the partial region is utilized by users in the partial region. On the contrary, absence of a user in a partial region causes waste in the frequency resource due to unutilization of residual allocable frequency band.

In the FFR system or the SFR system, accordingly, when users are not uniformly distributed, the flexibility in allocation of the frequency resource and the frequency reuse rate of 1 are not obtainable, thereby reducing the efficiency of the frequency resource. Not only the FFR system and the SFR system but also most of frequency resource allocation systems for relieving same channel interference commonly have these problems.

SUMMARY

Accordingly, the present invention is directed to a method and an apparatus for staggered zone resource allocation in an orthogonal frequency division multiple access system that substantially obviates one or more of the problems due to limitations and disadvantages of the related art.

An object of the present invention is to provide a method and an apparatus for resource allocation in an orthogonal frequency division multiple access system where same channel interference between cells is minimized and a frequency efficiency is maximized even with a frequency reuse rate of 1.

Another object of the present invention is to provide a method and an apparatus for resource allocation in an orthogonal frequency division multiple access system that is independent of a position distribution of users in a cell and is flexibly applicable to increase and decrease of traffic load in a cell even with a frequency reuse rate of 1.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a method for staggered zone resource allocation in an orthogonal frequency division multiple access (OFDMA) system having a cluster includes: dividing a frequency resource of the OFDMA system into a plurality of time zones along a time axis; determining at least two resource allocation start zones among the plurality of time zones in at least two cells of the cluster, respectively; arranging users in each of the at least two cell according to a path loss in a descending order; and sequentially allocating the frequency resource to the arranged users from the at least two resource allocation start zones in the at least two cells, respectively.

In the method, the at least two resource allocation start zones are different from each other, and the plurality of time zones have the same number as the at least two cells. In addition, the method further includes dividing the frequency resource into a plurality of sub-frequency bands along a frequency axis. Moreover, the step of sequentially allocating the frequency resource includes: allocating the frequency resource corresponding to a first sub-frequency band of the plurality of sub-frequency bands that a present user of the arranged users selects as a preferable band in a present time zone of the plurality of time zones; allocating the frequency resource corresponding to a second sub-frequency band of the plurality of sub-frequency bands that the present user selects as a next preferable band in the present time zone when there exists no residual allocable frequency resource corresponding to the first sub-frequency band; and allocating the frequency resource corresponding to a third sub-frequency band of the plurality of sub-frequency bands that the present user selects as the preferable band in a next time zone of the plurality of time zones when there exists no residual allocable frequency resource corresponding to the present time zone. Further, a frequency reuse rate of the OFDMA system is 1.

In another aspect, an apparatus for staggered zone resource allocation in an orthogonal frequency division multiple access (OFDMA) system having a cluster includes: a first unit dividing a frequency resource of the OFDMA system into a plurality of time zones along a time axis; a second unit determining at least two resource allocation start zones among the plurality of time zones in at least two cells of the cluster, respectively; a third unit arranging users selected by a scheduler in each of the at least two cell according to a path loss in a descending order; and a fourth unit sequentially allocating the frequency resource to the arranged users from the at least two resource allocation start zones in the at least two cells, respectively.

In the apparatus, the at least two resource allocation start zones are different from each other, and the plurality of time zones have the same number as the at least two cells. In addition, the apparatus further includes a fifth unit dividing the frequency resource into a plurality of frequency bands along a frequency axis. Moreover, the fourth unit allocates: the frequency resource corresponding to a first sub-frequency band of the plurality of sub-frequency bands that a present user of the arranged users selects as a preferable band in a present time zone of the plurality of time zones; the frequency resource corresponding to a second sub-frequency band of the plurality of sub-frequency bands that the present user selects as a next preferable band in the present time zone when there exists no residual allocable frequency resource corresponding to the first sub-frequency band; and the frequency resource corresponding to a third sub-frequency band of the plurality of sub-frequency bands that the present user selects as the preferable band in a next time zone of the plurality of time zones when there exists no residual allocable frequency resource corresponding to the present time zone.

BRIEF DESCRIPTION OF THE DRAWINGS

The accompanying drawings, which are included to provide a further understanding of the invention and are incorporated in and constitute a part of this specification, illustrate embodiments of the invention.

DETAILED DESCRIPTION OF THE PREFERRED EMBODIMENTS

Reference will now be made in detail to embodiments which are illustrated in the accompanying drawings. Since the structure and function of the present invention illustrated referring the drawings are shown as an embodiment, the spirit and the subject in structure and function of the present invention will not be limited by the embodiment. Wherever possible, a common terminology most widely used is selected for illustration. When a specific terminology is used, a meaning of the terminology will be illustrated in the description. Accordingly, the terminology should not be interpreted only by a name of the terminology but also by the meaning of the terminology.

The present invention provides a method and an apparatus for resource allocation in an orthogonal frequency division multiple access (OFDMA) system where an intercellular interference is minimized and an efficiency of frequency resource is maximized with using a frequency reuse rate of 1. Specifically, the present invention provides a method and an apparatus for staggered zone resource allocation (SZRA) where a frequency resource in a cell is allocated by dispersion in time to obtain a frequency reuse coefficient (K) of 1.

Figure 4:
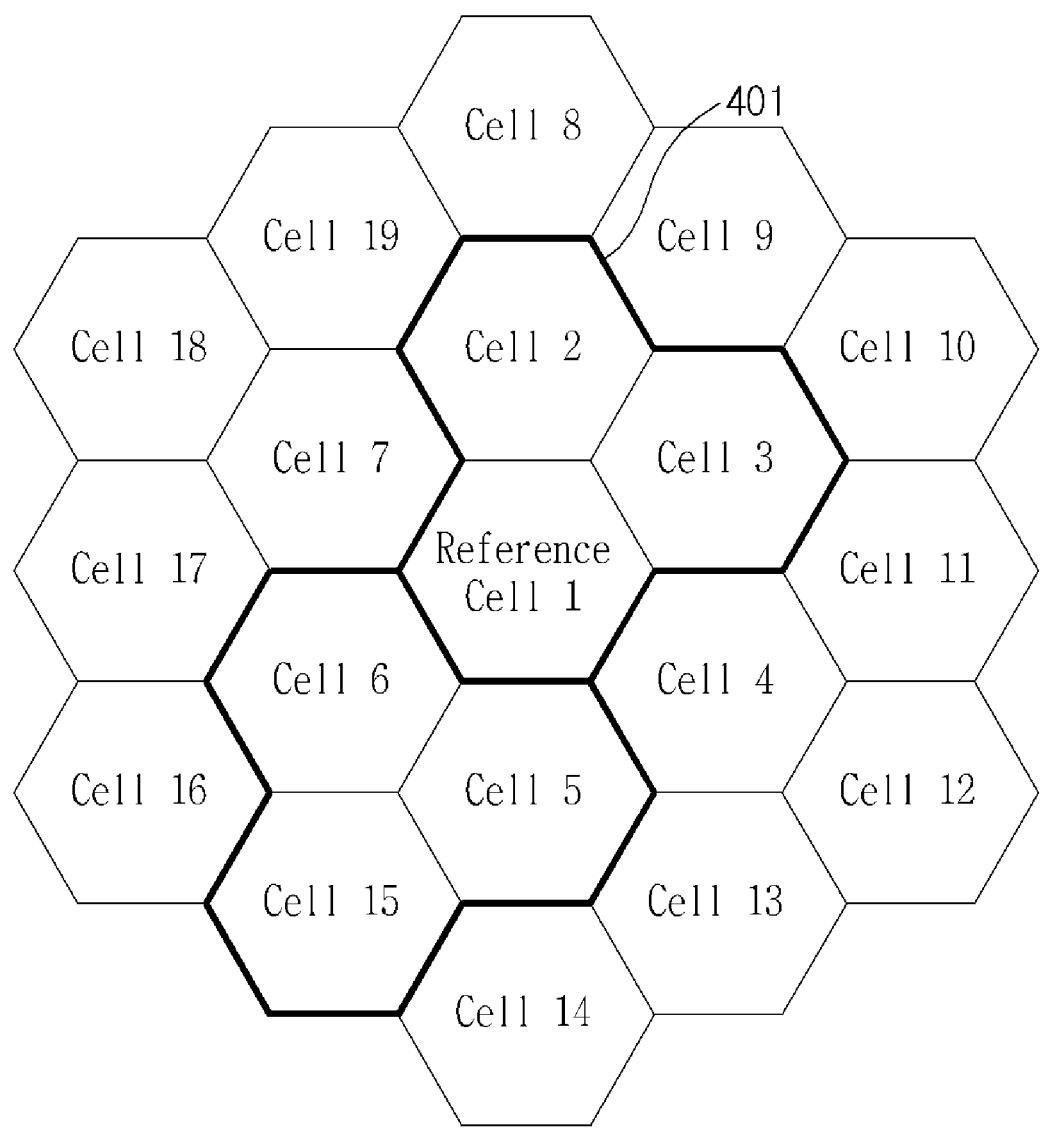
FIG. 4 is a view showing a cellular system using a method for SZRA according to an embodiment of the present invention.

FIG. 4 is a view showing a cellular system using a method for SZRA according to an embodiment of the present invention.

Figure 1:
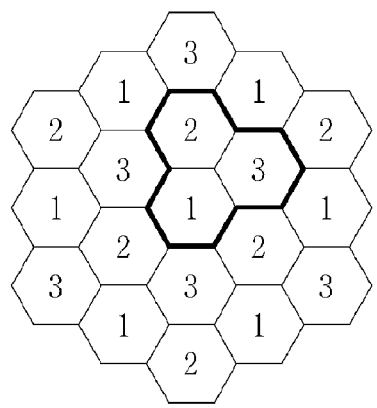
FIG. 1 is a view illustrating a frequency resource allocation in a multiple cell system having a frequency reuse coefficient (K) of 3 (K=3) according to the related art.
Figure 1:
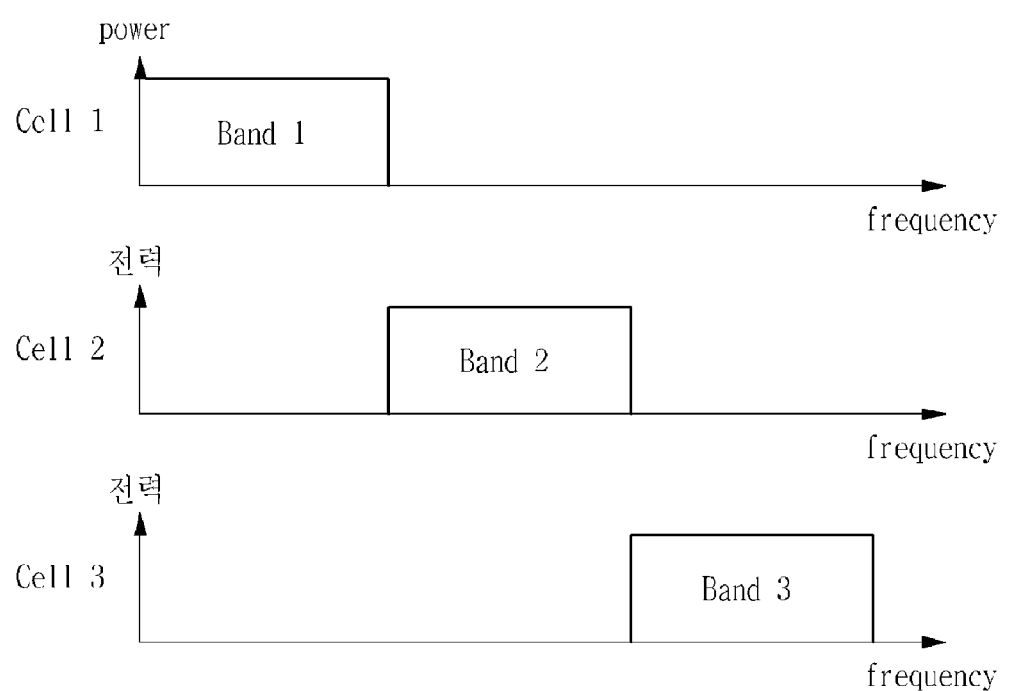
Figure 2:
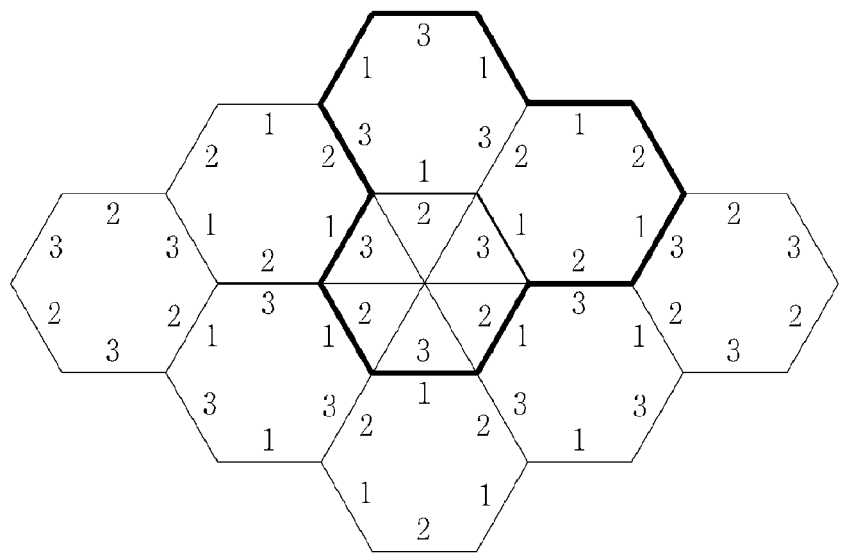
FIG. 2 is a view illustrating a frequency resource allocation in a fractional frequency reuse (FFR) system suggested by IEEE 802.20 Mobile Broadband Wireless Access (MBWA) standard as a solution for interference at a cell boundary.
Figure 2:
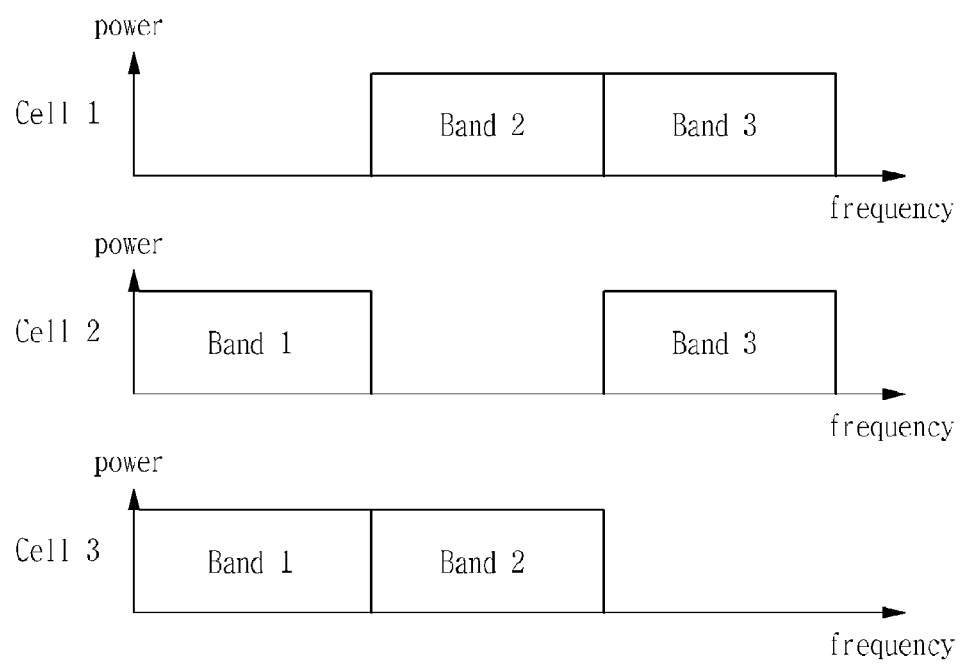
Figure 3:
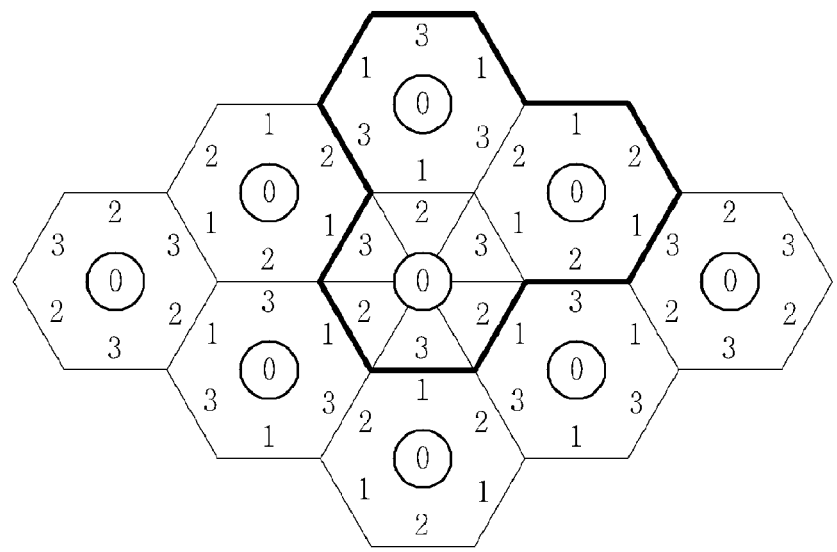
FIG. 3 is a view illustrating a frequency resource allocation in a soft frequency reuse (SFR) system suggested by 3GPPLTE ($3^{rd}$ Generation Partnership Project Long Term Evolution)
Figure 3:
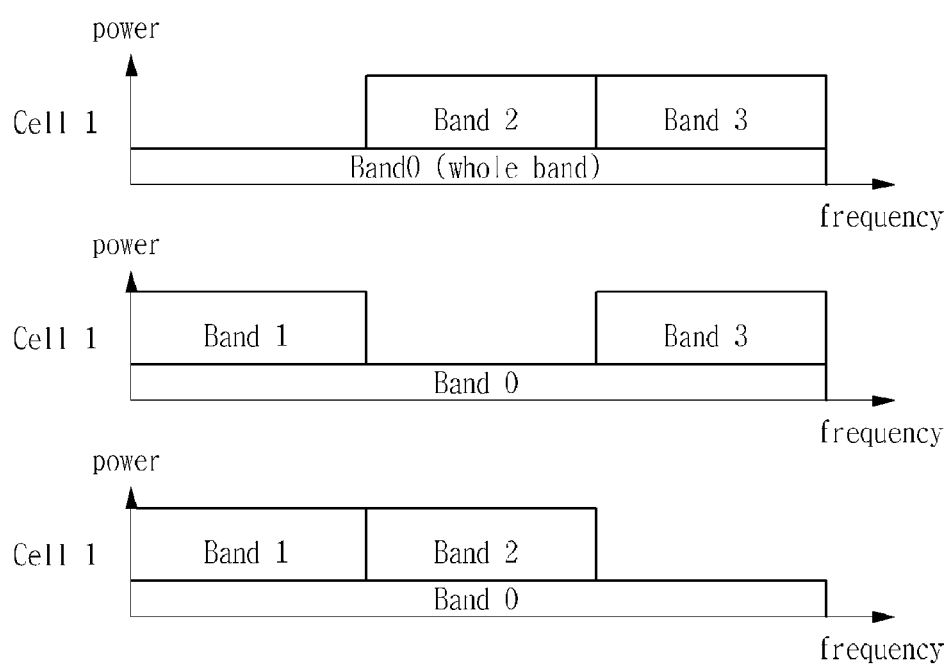

In FIG. 4, the cellular system includes a plurality of cells Cell1 to Cell 19, and a cluster 401 may be defined by three adjacent cells in the cellular system. In addition, it is assumed that all cells of the cellular system belong to one cluster. Accordingly, the cellular system may be divided into a plurality of clusters and each cell may be assumed to have a frequency reuse coefficient of 1 (K=1) where a whole frequency band is utilized. The cell number dose not mean the frequency reuse coefficient as in FIG. 1. Although one cluster includes three cells in this embodiment, one cluster may include at least two cells in another embodiment.

Figure 5:
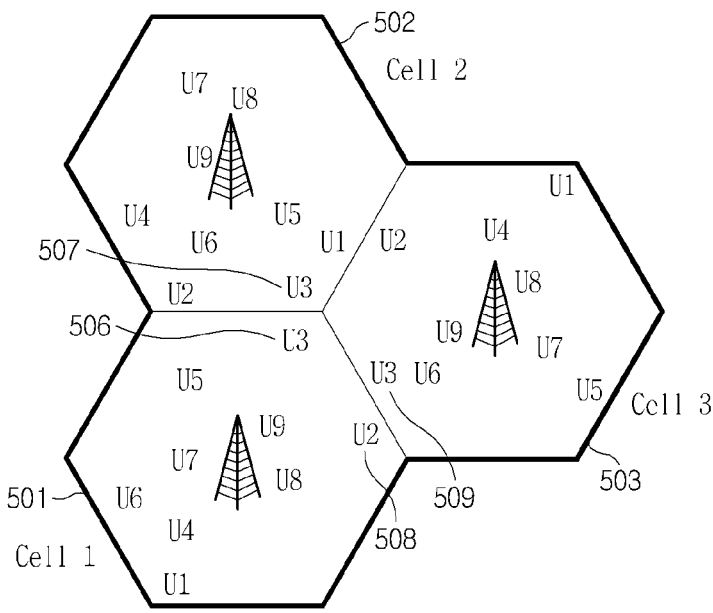
FIG. 5 is a view showing a cluster of a cellular system using a method for SZRA according to an embodiment of the present invention.
Figure 5:
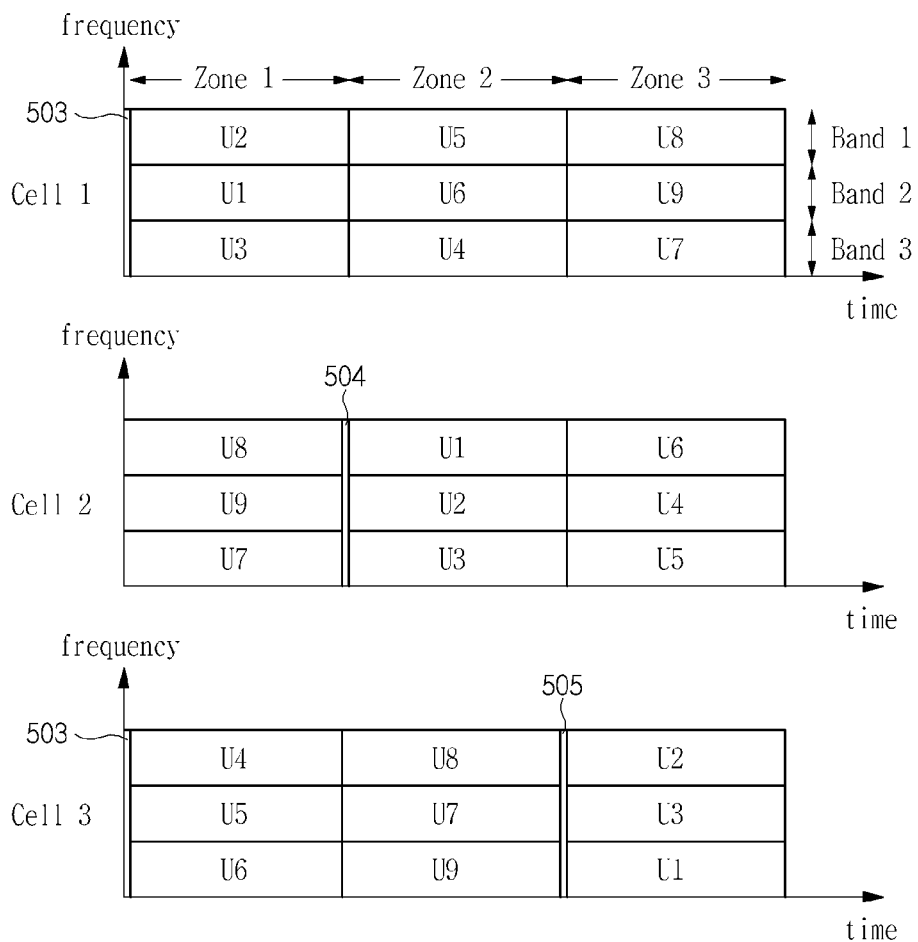

FIG. 5 is a view showing a cluster of a cellular system using a method for SZRA according to an embodiment of the present invention.

In FIG. 5, a cellular system includes a plurality of clusters each having three adjacent cells and all of the plurality of clusters have the same resource allocation method as each other. Accordingly, one exemplary cluster having three cells will be illustrated hereinafter.

The cluster includes first, second and third cells (Cell1, Cell2 and Cell3) 501, 502 and 503. The frequency resource may be divided in time and frequency for allocation. For example, the frequency resource may be divided into first, second and third time zones Zone1, Zone2 and Zone3 along a time axis and may be divided into first, second and third sub-frequency bands Band1, Band2 and Band3 along a frequency axis. As a result, the frequency resource may be classified into nine portions each corresponding to one time zone and one sub-frequency band. Therefore, the frequency resource corresponding to one time zone and one sub-frequency band may be allocated to one user in each cell 501, 502 and 503. Although first, second and third time zones Zone1, Zone2 and Zone3 and first, second and third sub-frequency bands Band1, Band2 and Band3 are used for allocation in FIG. 5, the number of the time zones and the number of the sub-frequency bands may be varied according to the cellular system in another embodiment and an amount of the frequency resource allocated to one user may be also varied.

First to ninth users U1 to U9 are assumed to be randomly located in each cell 501, 502 and 503. A scheduler of a radio access station (RAS) selects the first to nine users U1 to U9 among all users in each cell for frequency resource allocation. The first to nine users U1 to U9 users are arranged according to a distance from the RAS in descending order, i.e., according to a path loss in descending order. For example, the first to ninth users U1 and U9 may be arranged from the first user U1 having the greatest path loss to the ninth user U9 having the smallest path loss. In addition, the scheduler begins to allocate the frequency resource to the first user U1 having the greatest path loss first. Here, it is assumed that the first user U1 has the greatest path loss, the second user U2 has the next greatest path loss, and the ninth user U9 has the smallest path loss.

The order of frequency resource allocation may be expressed as follows. Order of frequency resource allocation: RA_index={U1, U2, U3, . . . , U9} First, the preferable band having the best channel state recognized by the first user U1 among the first, second and third sub-frequency bands Band1, Band2 and Band3 corresponding to a predetermined resource allocation start zone in each cell 501, 502 and 503 is allocated to the first user U1 having the greatest path loss at a cell boundary region.

The resource allocation start zone will be illustrated hereinafter. The cluster includes the first, second and third cells (Cell1, Cell2 and Cell3) 501, 502 and 503. In the first cell (Cell1) 501, the frequency resource begins to be allocated from a first starting portion 504 of the first time zone Zone1. Similarly, the frequency resource begins to be allocated from a second starting portion 505 of the second time zone Zone2 in the second cell (Cell2) 502, and the frequency resource begins to be allocated from a third starting portion 506 of the third time zone Zone3 in the third cell (Cell3) 503. As a result, the frequency resource begins to be allocated from different starting portion in each cell 501, 502 and 503, and the different time zone corresponding to the starting portion may be defined as a resource allocation start zone in each cell 501, 502 and 503.

The RAS in each cell 501, 502 and 503 begins to allocate the frequency resource to the first user U1 from the resource allocation start zone. The users in each cell 501, 502 and 503 send a band channel quality identification (CQI) for each band Band1, Band2 and Band3 of a previous frame to the RAS as a feedback information. The RAS allocates the preferable band having the best channel state obtained by using the band CQI to the first user U1. After the frequency resource allocation to the first user U1 is finished, the RAS begins to allocate the frequency resource to the second user U2 having the next greatest path loss. When the preferable band of the second user U2 is the same as the preferable band of the first user U1 and there exists a residual allocable frequency resource in the preferable band, the residual allocable frequency resource in the preferable band is allocated to the second user U2. When the preferable band of the second user U2 is the same as the preferable band of the first user U1 and there exists no residual allocable frequency resource in the preferable band, the next preferable band in the same time zone is allocated to the second user U2. Finally, when there exists no allocable frequency resource in the corresponding time zone, the preferable band in the next time zone is allocated to the second user U2.

A method for frequency resource allocation according to an embodiment of the present invention will be illustrated in more detail hereinafter. For simplicity of illustration, it is assumed that each cell has a frequency resource of three time zone and three sub-frequency bands in a frame and the frequency resource of one time zone and one sub-frequency band is allocated to each of nine users located in each cell.

The first to ninth users U1 to U9 are arranged according to a path loss in descending order and the first user U1 has the greatest path loss. Since the first cell (Cell1) 501 has the first time zone Zone1 corresponding to the first starting portion 504 as the resource allocation start zone, the frequency resource corresponding to the second sub-frequency band Band2 of the first time zone Zone1 that has the best channel state recognized by the first user U1 is allocated to the first user U1. Next, the frequency resource corresponding to the first sub-frequency band Band2 is allocated to the second user U2. When the preferable band of the second user U2 is the second sub-frequency band Band2 and there exists a residual allocable frequency resource corresponding to the second sub-frequency band Band2, the frequency resource corresponding to the second sub-frequency band Band2 having the residual allocable frequency resource is allocated to the second user U2. Similarly, the frequency resource corresponding to the first, second and third sub-frequency bands Band1, Band2 and Band3 of the first time zone Zone1 are sequentially allocated to the users arranged according to a path loss in descending order till the frequency resource corresponding to the first, second and third sub-frequency bands Band1, Band2 and Band3 of the first time zone Zone1 is exhausted.

After the frequency resource of the first time zone Zone1 is allocated to the first, second and third users U1, U2 and U3, the frequency resource corresponding to the third sub-frequency band Band3 of the next zone, i.e., the second zone Zone2 that has the best channel state recognized by the fourth user U4 is allocated to the fourth user U4. Similarly, the frequency resource corresponding to the first and second sub-frequency bands Band1 and Band2 of the second time zone Zone2 are allocated to the fifth and sixth users U5 and U6, respectively. Next, the frequency resource corresponding to the third, first and second sub-frequency bands Band3, Band1 and Band2 of the third time zone Zone3 are sequentially allocated to the seventh, eighth and ninth users U7, U8 and U9, respectively.

Since the second cell (Cell2) 502 has the second time zone Zone2 corresponding to the second starting portion 505 as the resource allocation start zone, the frequency resource corresponding to the preferable band of the first user U1, i.e., the first sub-frequency band Band1 of the second time zone Zone2 is allocated to the first user U1. The frequency resource is sequentially to the second to ninth users U2 to U9 in the second cell (Cell2) 502 in a manner similar to the above-mentioned manner. In the second cell (Cell2) 502, after the frequency resource of the second zone Zone2 is exhausted, the frequency resource of the third zone Zone3 is allocated to the users, and after the frequency resource of the second zone Zone2 is exhausted, frequency resource of the first zone Zone1 is allocated to the users.

In the third cell (Cell3) 503, the frequency resource is allocated to the users in a similar manner. Since the third cell (Cell3) 503 has the third time zone Zone3 corresponding to the third starting portion 506 as the resource allocation start zone, the frequency resource is allocated to the nine users in an order from the third time zone Zone3 to the second time zone Zone2 through the first time zone Zone1 (Zone3→Zone1→Zone3).

Figure 6:
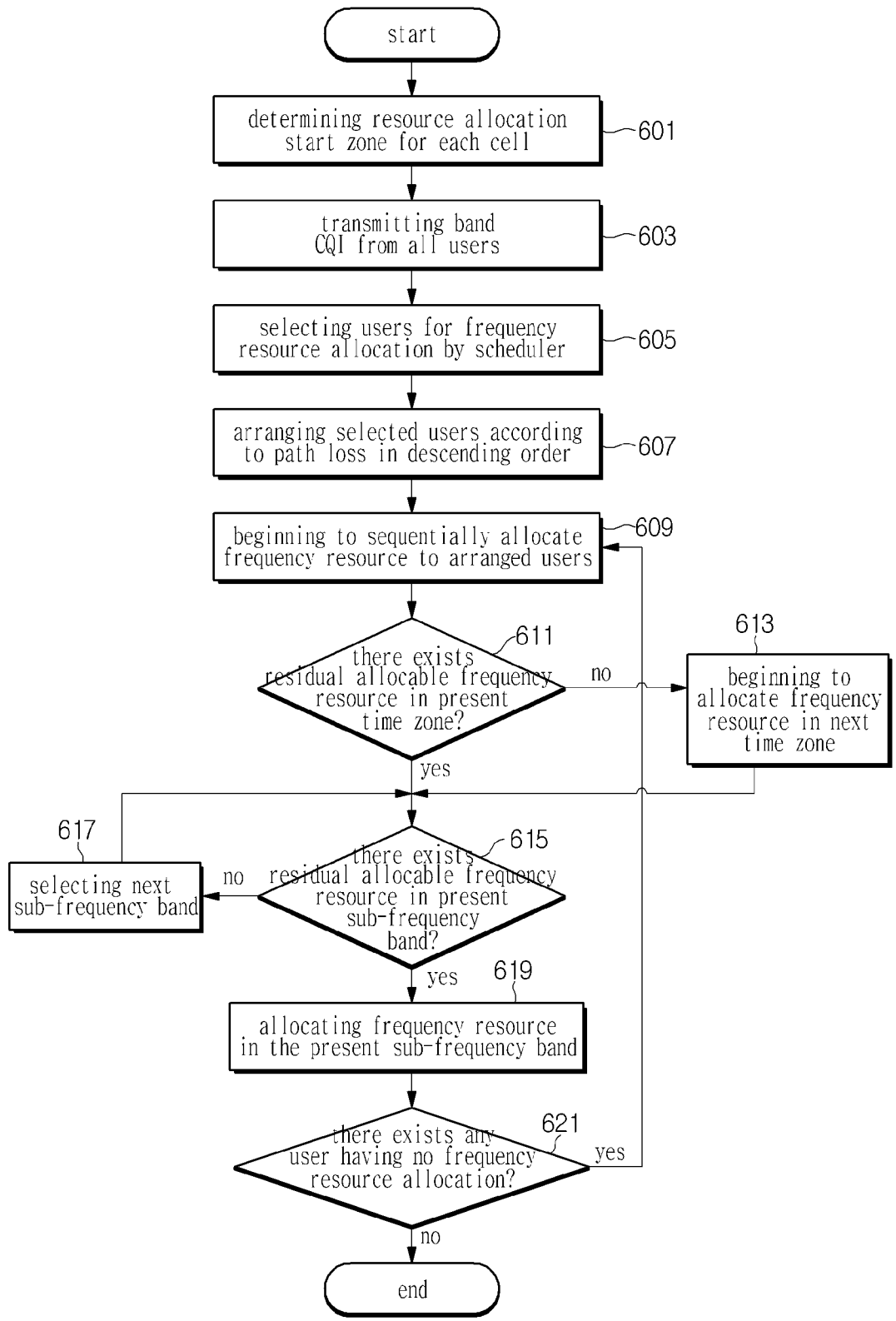
FIG. 6 is a flow chart illustrating a method for SZRA according to an embodiment of the present invention.

FIG. 6 is a flow chart illustrating a method for SZRA according to an embodiment of the present invention.

In FIG. 6, a resource allocation start zone is determined for each cell of a cluster at a step of 601. In addition, a band CQI is transmitted to a RAS in each cell as a feedback information from all users at a step of 603. A scheduler of the RAS selects users for frequency resource allocation at a step of 605. Next, the selected users are arranged according to a path loss in a descending order by the RAS at a step of 607. The frequency resource begins to be sequentially allocated to the arranged users at a step of 609. The RAS judges whether there exists a residual allocable frequency resource in the present time zone for the present users at a step of 611. The initial value of the present time zone is the same as the resource allocation start zone. According to the judgment result at the step of 611, a step of 613 is performed when there exists no residual allocable frequency resource in the present time zone, and a step of 615 is performed when there exists a residual allocable frequency resource. At the step of 613, the RAS begins to allocate the frequency resource in the next time zone and then the step of 615 is performed.

At the step of 615, the RAS judges whether there exists a residual allocable frequency resource corresponding to a present sub-frequency band of the corresponding time zone for the present user. The initial value of the present sub-frequency band is the same as the preferable band determined by the band CQI. According to the judgment result at the step of 615, a step of 617 is performed when there exists no residual allocable frequency resources corresponding to the present sub-frequency band, and a step of 619 is performed when there exists a residual allocable frequency resource corresponding to the present sub-frequency band. At the step of 617, the RAS selects the next sub-frequency band that the present user selects as the next preferable band and then the step of 615 is performed again. At the step of 619, the RAS allocates the frequency resource corresponding to the present sub-frequency band of the present time zone to the present user.

Next, the RAS judges whether there exists any user having no frequency resource allocation at a step of 621. According to the judgment result at the step of 621, the step of 609 is performed when there exists a user having no frequency resource allocation, and the frequency resource allocation is finished when there exists no user having no frequency resource allocation, i.e., the frequency resource has been allocated to all users.

In the method for SZRA according to an embodiment of the present invention, since the frequency resource is allocated to users at the cell boundary region of the different cells in the different time zones, the user at the cell boundary region do not experience the intercellular interference due to simultaneousness in communication of the users. For example, when the third user (U3) 507 of the first cell (Cell1) 501 using the frequency resource corresponding to the third sub-frequency band Band3 and the third user (U3) 508 of the second cell (Cell12) 502 using the frequency resource corresponding to the third sub-frequency band Band3 communicate with respective RASs at the same time, the adjacent third users (U3) 507 and (U3) 508 may experience the severe intercellular interference because of relatively near distance therebetween. In the system using the method for SZRA, however, since the third user (U3) 507 of the first cell (Cell1) 501 communicates with the RAS using the frequency resource corresponding to third sub-frequency band Band3 of the first time zone Zone1 and the third user (U3) 508 of the second cell (Cell2) 502 communicates with the RAS using the frequency resource corresponding to the third sub-frequency band Band3 of the second time zone Zone2, the adjacent third users (U3) 507 and (U3) 508 do not experience the intercellular interference at all. Similarly, although the second user (U2) 509 of the first cell (Cell1) 501 and the third user (U3) 510 of the third cell (Cell3) 503 are positioned at the cell boundary region with the relatively near distance, the second user (U2) 509 communicates with the RAS using the first time zone Zone1 and the third user (U3) 510 communicates with the RAS using the third time zone Zone3, thereby the intercellular interference prevented. In addition, the eighth user U8 of the second cell (Cell2) 502 and the fourth user U4 of the third cell (Cell3) use the frequency resource corresponding to the first sub-frequency band Band1 of the first time zone Zone1 that the second user (U2) 509 of the first cell (Cell1) uses for communication. However, since the eighth user U8 of the second cell (Cell2) 502 and the fourth user U4 of the third cell (Cell3) are located adjacent to the respective RASs at a central region of each cell relatively far from the cell boundary region where the second user (U2) 509 of the first cell (Cell1) located, the intercellular interferences between the second user (U2) 509 of the first cell (Cell1) and the eighth user U8 of the second cell (Cell2) 502 and between the second user (U2) 509 of the first cell (Cell1) and the fourth user U4 of the third cell (Cell3) are minimized.

In the multiple cell communication system of FIG. 6, the frequency efficiency is maximized with obtaining a frequency reuse rate of 1. In addition, since the frequency resource is dispersively allocated to the users at the cell boundary region due to different resource allocation start zone, the intercellular interference is removed or reduced and the reduction in function of the system is prevented. Further, since the frequency reuse rate of 1 is obtained independently of location distribution of the users and the cellular load and the frequency resource is adaptively allocated with reduction of the intercellular interference, flexibility in frequency resource allocation is obtained.

Consequently, in a method and an apparatus for SZRA according to an embodiment of the present invention, since the whole frequency resource along the frequency axis is allocated from the resource allocation start zone, the frequency reuse rate of 1 is obtained and the efficiency of frequency reuse is improved. In addition, since the frequency resource is sequentially allocated to the users according to the path loss in a descending order even when the users are asymmetrically located in each cell, the frequency resource is properly allocated without lack and waste.

It will be apparent to those skilled in the art that various modifications and variations can be made in a method and an apparatus for staggered zone resource allocation in orthogonal frequency division multiple access system of the present invention without departing from the spirit or scope of the invention. Thus, it is intended that the present invention cover the modifications and variations of this invention provided they come within the scope of the appended claims and their equivalents.

What is claimed is:

1. A method for staggered zone resource allocation in an orthogonal frequency division multiple access (OFDMA) system having a cluster, comprising:
dividing a frequency resource of the OFDMA system into a plurality of time zones along a time axis;
dividing the frequency resource into a plurality of sub-frequency bands along a frequency axis;
determining at least two resource allocation start zones among the plurality of time zones in at least two cells of the cluster, respectively;
arranging users in each of the at least two cell according to a path loss in a descending order; and
sequentially allocating the frequency resource to the arranged users from the at least two resource allocation start zones in the at least two cells, respectively, by
allocating the frequency resource corresponding to a first sub frequency band of the plurality of sub-frequency bands that a present user of the arranged users selects as a preferable band in a present time zone of the plurality of time zones;
allocating the frequency resource corresponding to a second sub-frequency band of the plurality of sub-frequency bands that the present user selects as a next preferable band in the present time zone when there exists no residual allocable frequency resource corresponding to the first sub-frequency band; and
allocating the frequency resource corresponding to a third sub-frequency band of the plurality of sub-frequency bands that the present user selects as the preferable band in a next time zone of the plurality of time zones when there exists no residual allocable frequency resource corresponding to the present time zone.

2. The method according to claim 1, wherein the at least two resource allocation start zones are different from each other.

3. The method according to claim 1, wherein the plurality of time zones have the same number as the at least two cells.

4. The method according to claim 1, wherein a frequency reuse rate of the OFDMA system is 1.

5. An apparatus for staggered zone resource allocation in an orthogonal frequency division multiple access (OFDMA) system having a cluster, comprising:
a first unit dividing a frequency resource of the OFDMA system into a plurality of time zones along a time axis;
a second unit determining at least two resource allocation start zones among the plurality of time zones in at least two cells of the cluster, respectively;
a third unit arranging users selected by a scheduler in each of the at least two cell according to a path loss in a descending order; and
a fourth unit sequentially allocating the frequency resource to the arranged users from the at least two resource allocation start zones in the at least two cells, respectively, wherein
the fourth unit allocates:
the frequency resource corresponding to a first sub-frequency band of the plurality of sub-frequency bands that a present user of the arranged users selects as a preferable band in a present time zone of the plurality of time zones;
the frequency resource corresponding to a second sub-frequency band of the plurality of sub-frequency bands that the present user selects as a next preferable band in the present time zone when there exists no residual allocable frequency resource corresponding to the first sub-frequency band; and
the frequency resource corresponding to a third sub-frequency band of the plurality of sub-frequency bands that the present user selects as the preferable band in a next time zone of the plurality of time zones when there exists no residual allocable frequency resource corresponding to the present time zone.

6. The apparatus according to claim 5, wherein the at least two resource allocation start zones are different from each other.

7. The apparatus according to claim 5, wherein the plurality of time zones have the same number as the at least two cells.

8. The apparatus according to claim 5, further comprising a fifth unit dividing the frequency resource into a plurality of frequency bands along a frequency axis.

* * * * *